(12) United States Patent  
Davidson

(10) Patent No.: US 6,230,213 B1  
(45) Date of Patent: May 8, 2001

(54) EXTENSIBLE MECHANISM FOR PROVIDING SAFE AUTOMATIC MANAGEMENT OF OBJECTS

(75) Inventor: Thomas J. Davidson, Austin, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/040,108

(22) Filed: Mar. 17, 1998

Related U.S. Application Data

(60) Provisional application No. 60/041,079, filed on Mar. 18, 1997.

(51) Int. Cl.[7] ............................................. G06F 9/46
(52) U.S. Cl. ........................................ 709/316; 707/103
(58) Field of Search .................................... 709/300, 303, 709/100, 101, 102, 103, 104, 106, 108, 316, 318, 310; 707/103

(56) References Cited

U.S. PATENT DOCUMENTS 4,695,949 * 9/1987 Thatte et al. .......................... 364/200
4,755,939 * 7/1988 Watson .................................. 364/300
4,853,842 * 8/1989 Thatte et al. .......................... 364/200

* cited by examiner

*Primary Examiner*—Majid A. Banankhah
(74) *Attorney, Agent, or Firm*—Leah Sherry; Oppenheimer Wolff & Donnelly LLP

(57) ABSTRACT

Disclosed is an object-oriented programming mechanism to control and manage object ownership by more than one reference. According to that mechanism, an envelope class is created in a manner that makes itself look (to the user) like the actual object. The envelope class is then used to create an envelope object that references the actual object, and used as a base for all other references to the actual object to which the object reference relates. The envelope object keeps track of how many references are made to the underlying object by maintaining a reference count that is incremented with each reference to the object that is established, and decremented each time a reference is deleted or goes out of scope. The object reference will keep the object viable (i.e., maintain its memory space) until the last reference to the object goes out of scope. When this happens, the envelope object will then call upon one or more virtual member functions to destroy the object and free the memory space it was using.

7 Claims, 2 Drawing Sheets

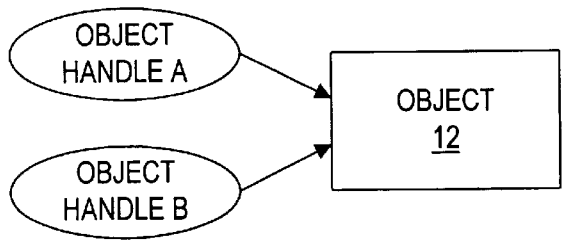
FIG. 1A
(PRIOR ART)
FIG. 1B
(PRIOR ART)
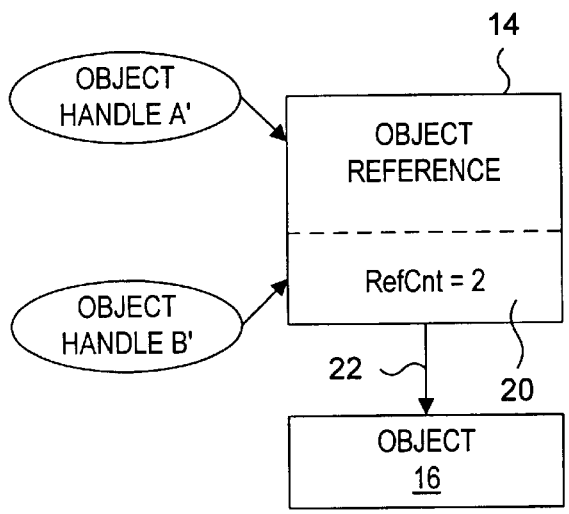
FIG. 2A
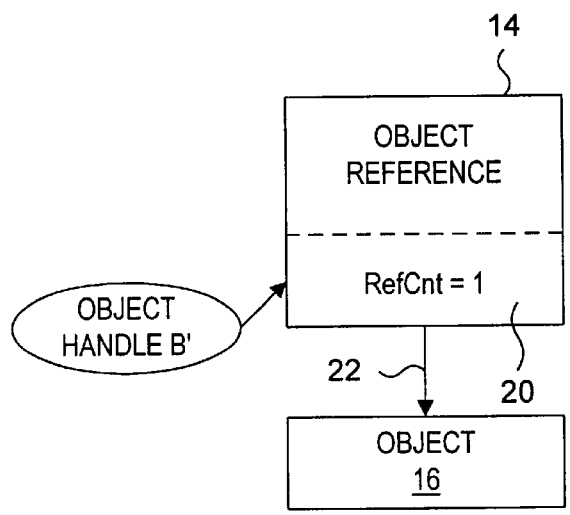
FIG. 2B
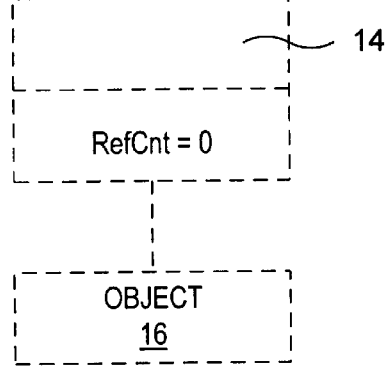
FIG. 2C

EXTENSIBLE MECHANISM FOR PROVIDING SAFE AUTOMATIC MANAGEMENT OF OBJECTS

This application claims the benefit of Provisional No. 60/041,079 filed Mar. 18, 1997.

NOTICE REGARDING COPYRIGHT RIGHTS

A portion of the disclosure of this patent document contains material that is subject to copyright protection.

The copyright owner has no objection to the facsimile reproduction by anyone of the patent document or the patent disclosure, as it appears in the Patent and Trademark Office file or records, but otherwise reserves all copyright rights whatsoever in the material contained herein.

BACKGROUND OF THE INVENTION

This invention relates to object oriented programs of the type that create and interact with objects.

Most programming languages, such as C++, deal with objects (encapsulations of data structures and associated operation(s)) as in-memory data structures with some associated behavior. The ability to access such objects has been difficult in light of residency and memory management issues. For example, C++ is a language which is derived in part from C, and as such, it suffers from many of the same problems of memory management that C programs have. The use of pointers and, to a lesser extent references, contribute to an overall lack of robustness in many C++ applications.

A central issue is that of object ownership. If an object is referenced by another C++ object, either by pointer or reference, who owns the object? What happens if the object is deleted with references still outstanding? For example, FIG. 1A illustrates two object references A and B referencing an object 12. The object 12 may, for example, be a word processing document view, and the two references A and B two different screens of that word processing document view. Both object references "own" the object. Suppose, however, the object reference A is closed, causing the closure or destruction of the object 12 in order free up memory in the associated computing system. As illustrated in FIG. 1B, with the reference object A now gone, and with it the object 12, the object reference B references an invalid memory location, and any changes that may have been made by the objection reference B will most likely be lost.

Thus, there has been a need to provide a method of object access that addresses such issues.

SUMMARY OF THE INVENTION

The present invention provides the ability to access objects (program data structures and associated operation (s)) without undue regard to residency and memory management issues. The invention is extensible to permit different underlying representations and access semantics to be implemented.

The invention builds upon the envelope-letter pattern (Coplien, James O., "Advanced C++ Programming Styles and Idioms," Addison-Wesley Publishing Co, Inc. ISBN: 0-201-54855-0) in several key areas:

- type safety is guaranteed at the programmer level.
- access to different points in the inheritance hierarchy is provided. (The object may be one type, the user may only know of a different or related type.)
- read and write access is separately tracked to permit underlying representations, such as databases, to be updated only when needed.
- many different underlying representations, such as databases, dynamic code libraries and remote objects may be used to provide the programmer with a consistent and transparent access view.
- when coupled with memory management objects, automatic allocation and de-allocation of resources is possible.

Broadly, the invention provides a mechanism to control and manage object ownership by creating an envelope class that makes itself look like (to the user) the actual object. An envelope object or object reference is created through the envelope class to reference the actual object, and used as a base for all other references to the actual object to which the envelope object relates. The envelope object keeps track of how many references are made to the underlying object by maintaining a reference count that is incremented with each reference to the object that is established, and decremented each time a reference is deleted or goes out of scope. The object reference will keep the object viable (i.e., maintain its memory space) until the last reference to the object goes out of scope. When this happens, the object reference will then call upon one or more virtual member functions to destroy the object and free the memory space it was using.

Thus, the invention has the advantage of allowing an object to be owned by more than one reference without fear of losing the object when the first of those references goes out of scope, destroying the object and leaving the remaining reference(s) pointing to an invalid portion of memory. In addition, the invention will ensure that when the last reference to use the object goes out of scope, the object is properly destroyed to free memory space.

Indeed, a very useful byproduct of the invention is the potential for abolishing the use of pointers and references in a large body of reusable code. This effectively closes a serious robustness hole in the use of C++.

In a further embodiment of the invention, the object reference may be specialized to the object. For example, when the last reference is deleted, the destruction of the object can include operations indigenous to the object, such as storing data structures, or returning memory to a heap, or other specialized management procedures.

These and other features, objects and advantages will become apparent to those skilled in this art upon a reading of the following detailed description together with the accompanying drawings and attached Appendix A (which contains the source code listing, in C++, of the parts of the invention).

BRIEF DESCRIPTION OF THE DRAWINGS

FIGS. 1A and 1B illustrate prior art object-oriented techniques for referencing an actual object;

FIGS. 2A, 2B, and 2C illustrate references to an actual object according to the present invention.

DESCRIPTION OF THE PREFERRED EMBODIMENT

Introduction

Figure 3A:
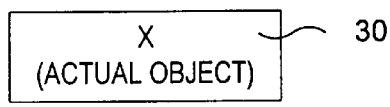
FIGS. 3A, 3B, 3C, and 3D diagrammatically illustrate use of the present invention to reference an actual object through an object reference created according to the teachings of the present invention.
Figure 3B:
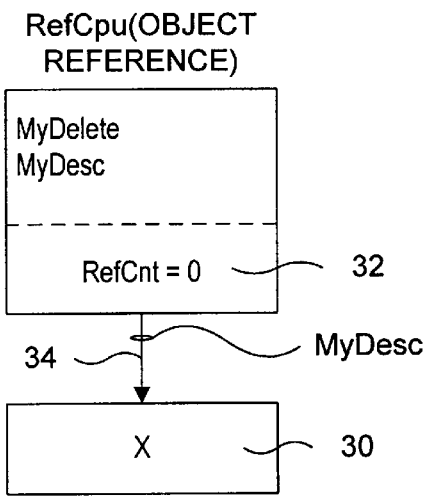
Figure 3C:
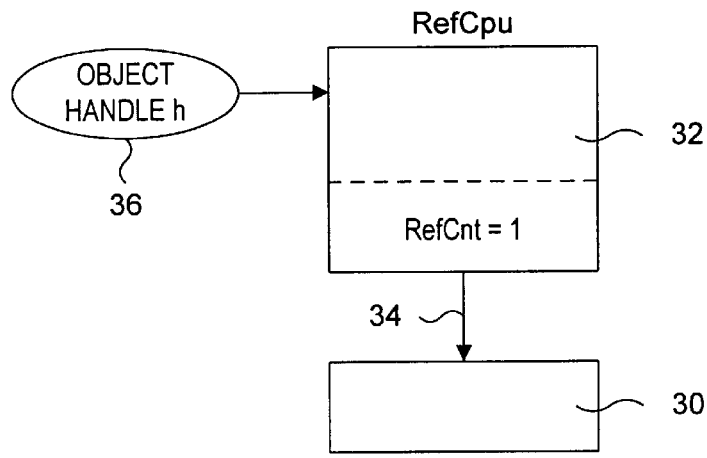
Figure 3D:
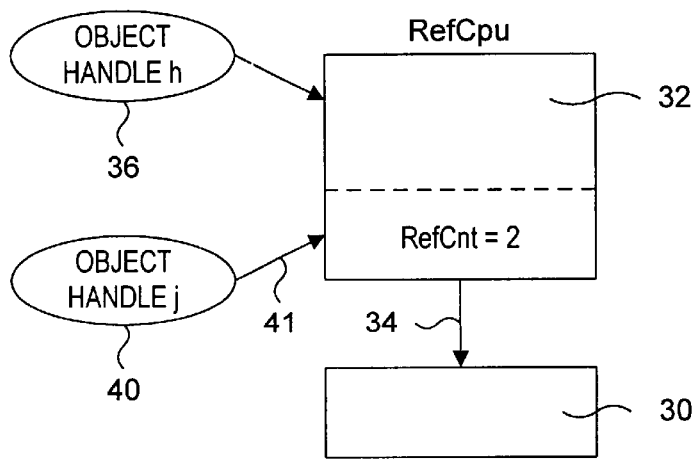

The present invention is directed to an extensible mechanism for creating and maintaining handle references that provide reference counting semantics and run-time resolution of object references. Attached hereto as Appendix A is the C++ language source code that forms one implementation of the invention and its various aspects described more fully below.

Referring first to FIGS. 2A and 2B, the basic concept of the invention is diagrammatically illustrated. In FIG. 2A an object reference 14 is created from a predefined class declaration with a reference 22 to the actual object 16. The object reference 14 includes a reference count (RefCnt) 20 20 that is initially 0. Then, for each user reference to the actual object 16 there is created an object handle with a pointer to the object reference 14. FIG. 2A shows two object handles, A' and B', created for the actual object 16, but with references to the object reference 14. Each time an object handle is created for the actual object 16, the RefCnt 20 maintained by the object reference 14 is incremented. Thus, as FIG. 2A illustrates, the RefCnt 20 is 2, confirming that two object handles (A' and B') are referencing the object reference 14 and through it (via the reference 22) the object 16.

FIG. 2B illustrates what happens when one of the object handles A', B' is destroyed. Here, the object handle A' is terminated, but the object handle B' continues to exist. With the destruction of the object handle A', the RefCnt 20 is decremented from 2 to 1. And, since the RefCnt 20 is not 0, the reference 22 to the object 16 is maintained. However, when the object handle B' is destroyed (FIG. 2C), causing RefCnt to be decremented to 0, virtual functions contained in the predefined class declaration used for creating the object reference 14 will also destroy the object and the object reference and/or invoke other specialized behavior according to the type of object reference.

The Basic Object Handle: TDMkhandle

Following the Caplien envelope idiom, a basic object handle class, called a TDMkHandle, is constructed. TDMkHandle is a template which closely resembles a pointer when used. It is created from an object reference, or another handle. When de-referenced, it yields a pointer to an object:

In this example, TDMKHandle is called upon to create an object handle h( . . . ) (of int type) which can have certain attributes, member functions, etc., defined by the TDMKHandle class declaration. Next, the object handle h is provided a value (432). The dereference step creates an integer (i) and assigns to it the value to which *h points to, the value 432.

The implementation of the handle template is accomplished via inline methods—as may be seen in Appendix A. (TDMkHandle is declared in the header file HANDLE.H.) It has been highly optimized for both space and time.

TDMkHandle objects may be copied and created from other TDMkHandle objects and will preserve the correct reference counts when doing so. For example, TDMkHandles may be safely down-casted and up-casted to objects in the derivation hierarchy. Resolution is deferred until actually needed, as described further below in the section on "TDMkHandle<T> Member Functions." Thus, Constness is obeyed by the handle mechanism. Const handles denote const objects.

Object References

Object references (base class TDMkHandleRef— declared in the header file HREF.H, Appendix A) are used to connect object handles (a sort of proxy object) to actual data objects. This can be an external relationship, or by deriving the actual object from a handle reference class.

The object reference creates and maintains a reference count value. Every object handle created results in the reference count being incremented (via a call to a virtual function in TDMkHandleRef). Destruction of an object handle decrements the reference count (also via a call to a virtual function in TDMkHandleRef). For example, TDMkHandleRef provides a set of virtual methods to customize the behavior of the object reference while preserving the type and semantics of the handle class and the underlying object. A variety of behaviors are possible with this approach. A few of them are described in the following section. The advantage of this separation is that the code developed and compiled to use objects managed by the handle mechanism does not have to be modified or re-compiled when new or different object references are utilized.

TDMkHandleRef may be specialized to produce or develop many interesting object reference classes. Described below are four examples of such specializations.

A first example is a TDMkHeapHandleRef class (declared in the header file HEAPREF.H, Appendix A), which specializes TDMkHandleRef by overriding the destroy member function to destroy both the TDMkHandleRef and the actual object. It therefore assumes that the TDMkHandleRef and actual objects have been allocated on heap.

1. Cpu *x=new CPu( . . . );
2. TDMkHandleRef *refCpu=new HeapHandleRef (tdmObjDesc(*x));
3. TDMkHandle<Cpu> h(*refCpu);
4. h–> . . .
5. TDMkHandle<Cpu> j=h;
6. destroy h;
7. destroy j;

Referring to FIGS. 3A–3D, there is shown in diagrammatic form what is accomplished by the code of the example set forth above. In the example, line 1 creates an object 30 (x) of type Cpu (FIG. 3A). Line 2 creates an object reference 32, refcpu, (FIG. 3B), of type TMDkHandleRef that includes three attributes: MyDelete, MyDesc, and RefCnt. RefCnt is a reference count that is incremented each time an object handle is created and referenced to refcpu (i.e., the object 30). MyDelete is a call to a member function of TDMkHandleRef that performs the operations necessary to deleting the object reference that initiated the call. MyDelete will also decrement RefCnt, and if zero is reached, MyDelete will make the call that destroys the object 30 and the object reference 32. Line 2 also shows use of the TDMkHeapHandleRef class to specialize the destroy function of TDMkHandleRef. The attribute MyDesc is a pointer 34 to the actual object 30.

Next, line 3 creates an object handle 36, h (FIG. 3C), to the object reference 32, refcpu, which (through a constructor of TDMkHandle) will increment RefCnt to 1. The object reference 32 can now be used (e.g., line 4) as a pointer to the actual object 30 in the same fashion as any other pointer. The intermediary, object reference 32, is transparent to the user.

Next, line 5 illustrates creation of another object handle 40, j (FIG. 3D), and, through the assignment to h, establishes the connection 41 to the object reference 32, refcpu. This will also increment RefCnt from 1 to 2. Now both object handles 36, 40 can now be used to identify the actual object 30. Both, in a sense, "own" the object 30.

However, as one object handle goes out of existence (or is otherwise deleted), destruction of the actual object 30 is prevented if the RefCnt is not 0, which indicates that there are other object handles still in existence).

In line 6, a pseudo-destroy function is called on the object handle 36, h, which, in turn, calls a TDMkHandle destructor, to also call to a virtual function ("release," see Appendix A, below) of TDMkHandleRef. The release virtual function will also call the destroy member function of TDMkHandle if RefCnt is not 0. But, the actual object 30, and the object reference 32, will remain since there is still an object handle (40) associated with the actual object 30.

But, when j calls the destroy function (line 7), the call to the release member function of TDMkHandleRef will decrement RefCnt (now, to 0). Now, since RefCnt is 0, the call to the destroy member function of TDMKhandle will cause the object reference 32, refcpu, and the actual object 30, x, to be destroyed. In addition, the destruction of the object may also entail any virtual functions added by any specializations (e.g., such as may be added by the TDMkHeapHandleRef class).

As has been shown, object references created according to the present invention provide an extensible mechanism for creating and maintaining numerous object handles that transparently reference the same actual object. They provide reference counting semantics and run-time resolution of object references. Handles, objects of type TDMkHandle<T>, work in conjunction with object references, objects of type TDMkHandleRef (or a derivation). Object handles provide the actual semantics of reference counting and object resolution.

Another example is a TDMkSharedHandleRef class (see header file SHARREF.H, Appendix A), which specializes TDMkHandleRef by overriding several member functions to automatically create a distributed object manager slave object and join to it when the first resolution occurs. (A distributed object manager is a programming system that enables execution of objects to be distributed around a heterogeneous network of a distributed processing system.) TDMkSharedHandleRef provides the following semantics:

> constructor. The constructor for an TDMkSharedHandleRef object has the arguments:
  a reference to a TDMkSession for the session of the server.
  a TDMkInstanceId of the master object in the server. The combination of TDMkSession and TDMkInstanceId uniquely identify an object in a server process.
> resolution. The first time a handle to an object of this type is resolved, a local object is created and then joined (or connected) with its counterpart in the server.
> destroy. When the last handle to an object of this type is released, the local object is detached from h=the server object and destroyed.

When the reference count decrements to zero, the slave object is detached and destroyed. The TDMkSharedHandleRef may be reused (it is not destroyed by the handle mechanism).

Yet another example is a TDMkThreadHandleRef which specializes TDMkHandleRef by adding thread create and rendezvous semantics. It would be used to express the result type from a function which can be executed in a separate thread in parallel to the caller. The caller can block waiting for the result by simply de-referencing the result value. The availability of the result parameter can be tested by the "isvalid" member function on the handle itself.

Finally, a TDMkDatabaseHandleRef class can specialize TDMkHandleRef by overriding several member functions to automatically load the object upon first resolution. If a non-const handle object is ever used, the object is marked as "perhaps written." When the reference count is decrements to zero, the object is written back to the database if needed and destroyed.

Using TDMkHandleRefs with Existing Classes

Existing classes are supported in the following way.
1. Objects are declared and implemented as usual.
2. For each new object instantiated, a TDMkHandleRef (or derivation) object should be created. This object is used to record the reference count for the actual object.
3. Users of the object create TDMkHandle objects using the TDMkHandleRef object, or another handle object, in the constructor for the handle.
4. All object access is performed through the TDMkHandle object by treating it as a pointer.

Using TDMkHandleRefs with New Classes

Object creators may choose to derive their objects from TDMkHandleRefIsv. The main benefit is that of improved performance. New classes are used in the following way:
1. The constructor for these classes must initialize the TDMkHandleRefIsv object with the TDMkObjDesc of the actual object being constructed. It is suggested to make TDMkHandleRefIsv a virtual derivation.
2. Objects are created as usual. (These objects are derived from TDMkHandleRefIsv.)
3. Users of the object create TDMkHandle objects using the TDMkHandleRefIsv object, or another handle object, in the constructor for the handle.
4. All object access is performed through the TDMkHandle object by treating it as a pointer.

Using handles will significantly improve the robustness of C++ applications and provide an exciting mechanism for building extensible libraries and applications.

Creating New Handle References

A new derivation of TDMkHandleRef would be performed if a new, or modified, management policy was required. For example: objects whose lifetime exceeds the life of the application (persistence), objects which are really proxied from another process. Objects whose execution context is in this address space, but which runs in parallel (perhaps on another cpu) to the invoking process). Of course, the derivation is expected to maintain the state of the base class, but may extend the semantics of the methods.

TDMkNewHandleReference( . . . ) . A constructor to initialize this new kind of handle reference.

virtual TDMkHandleRef* destroy(TDMkHandleBase*).
A function which is called after the last reference to this object is removed. This function may perform whatever bookkeeping is required, such as writing the object back to a stable storage device.

virtual TDMkobjDesc resolve(TDMBool& cache). A function which is called whenever a handle is first resolved and the handle is non-const. The function returns a description (address and type) of the actual object. The function is supplied a flag to indicate caching of the object information.

virtual TDMObjDesc resolveK(TDMBool& cache). A function which is called whenever a handle is first resolved and the handle is const. The function returns a description (address and type) of the actual object. The function is supplied a flag to indicate caching of the object information.

virtual void acquire( ). A function called whenever a new handle to an object is created. It should at least increment the reference count.

virtual TDMkHandleRef* release(TDMkHandleBase*). A function which is called whenever a handle to an object is to be destroyed. At a minimum, it must decrement the reference count and call destroy if it becomes zero. It returns a pointer to the handler reference.

virtual TDMBool isvalid ( ) const. A function which returns TRUE is the underlying object is valid.

virtual TDMObjDesc getObjDesc( ) const. A function which returns the description of the underlying object.

virtual const char *asText( ) const. A function which returns a printable version of the object reference. Often used for debugging.

TDMkHandle<T> Member Functions

TDMkHandle<T> ( ). The default constructor initializes a handle to an object of type T. Until it is bound to an actual object, this handle is considered not valid and should not be de-referenced.

TDMkHandle<T> (TDMkHandleRef&). This constructor initializes a handle to an object of type T from a handle reference (see Section, "Object References," above). The TDMkHandleRef referred to must share some part of the derivation hierarchy of type T. Resolution is deferred until actually needed. A reference is acquired in the handle reference object for this handle.

TDMkHandle<T> (TDMkHandle<T> &). This copy constructor initializes a handle from another handle. A handle reference is acquired from the handle reference object associated with the object being copied from. ~TDMkHandle<T> ( ). This destructor releases a handle reference to the underlying object.

const Handle<T> & operator=(const Handle<T> &) const. This assignment operator duplicates a handle. The new handle is left unresolved until needed.

Handle<T> & operator=(HandleRef&). This assignment operator creates a new handle from a handle reference object.

T* operator—> ( ). This operator returns a pointer to the underlying object. The first time that a handle is used, it is resolved. If resolution is impossible, an INV_OBJREF exception is thrown. The object reference is updated to indicate that the underlying object was potentially-written. const T* operator—> ( ) const. This operator returns a const pointer to the underlying object. The first time that a handle is used, it is resolved. If resolution is impossible, an INV_OBJREF exception is thrown.

T& operator*( ). This operator returns a reference to the underlying object. Resolution will be performed if necessary. This operator is intended for access to the actual object for assignment purposes only, not to locate the actual object. Such use defeats the purpose of handles.

const T& operator*( ) const. This operator returns a const reference to the underlying object. Resolution will be performed if necessary. This operator is intended for access to the actual object for assignment purposes only, not to locate the actual object. Such use defeats the purpose of handles.

operator TDMBool( ) const. This conversion operator returns TRUE if the handle has been, or is resolvable. Resolution takes place if not performed prior to this call.

operator TDMkHandleRef&( ). This conversion operator returns a handle reference object for the underlying object.

operator const TDMkHandleRef&( ) const. This conversion operator returns a const handle reference object for the underlying const object.

TDMkHandleRef Member Functions

TDMkHandleRef(const TDMkObjDesc&). This constructor initializes a handle reference from an object descriptor.

virtual—TDMkHandleRef. The destructor is made virtual in order to ensure correct semantics whenever a TDMkHandleRef object is destroyed.

virtual void acquire( ). This member function is called whenever a handle is created. The default implementation increments the reference count.

virtual RWCString asstring( ) const. This member function formats the contents of the handle reference to a printable form. The default implementation formats a TDMkHandleRef object.

virtual void destroy( ). This member function is called whenever the reference count of an object decrements to zero. The default implementation does nothing.

virtual TDMBool release( ). This member function is called whenever a handle object is destroyed or is the left-side of an assignment statement. It returns TRUE if the object is no longer used (and therefore destroy was called). The default implementation simply decrements the reference count and if it becomes zero returns by calling destroy.

virtual TDMkObjDesc resolve( ). This member function is called the first time that a non-const object handle is de-referenced. It should locate the actual object and return an object descriptor. The default implementation returns the object descriptor passed in the constructor call.

virtual TDMkObjDesc resolveK( ) const. This member function is called the first time that a const object handle is de-referenced. The default implementation returns the object descriptor passed in the constructor call.

Shared Handle References

As experience is gained by using distributed object manager techniques, some common themes emerge in the construction of various clients and servers. One such theme involves the series of steps to search a server instance dictionary, create a local object and to join the local object to its counterpart in the server.

A new and significant ease-of-use feature for distributed object management client applications is a shared handle reference mechanism, an extension of the handle mechanism described above. Shared handle reference mechanisms provide the capability to reference objects in a server through the use of handles. When de-referenced, a local slave object is utilized. The management of the local object is performed by this mechanism.

Session Instance Dictionary

When using a distributed object manager, client applications have access to the servers instance dictionary (because it is a shared object, joined with the server's process-wide instance dictionary). An instance dictionary is a collection of instance information objects indexed by an instance identifier. Each instance information object describes the type of object, its unique identifier in the server and an object of unspecified structure. This last object is typically used to contain information related to the discovery process, such as external names.

The instance information object, of type TDMkInstanceInfo, has been augmented to contain a TDMkSharedHandleRef object. A const accessor function, getHandleRef, returns a TDMKHandleRef object which can then be used to refer to a local object.

Usage

TDMkSharedHandleRef objects are used in the following way.

1. The client application locates an TDMkInstanceInfo object in the instance dictionary of the session object for the desired server. The distributed object manager mechanism builds a shared handle reference for each object in a session instance dictionary.
2. The client application creates a TDMkHandle<T> object.
3. The client application invokes the TDMkInstanceInfo-::getHandleRef accessor function to return a handle reference for a particular master object. It is assigned to the handle.
4. The first time the handle is de-referenced, the implementation of TDMkSharedHandleRef causes it to create a local object which is then joined/connected to the remote one in the server.
5. The client application uses the handle in exactly the same manner as any other handle.
6. When the last handle to a TDMkSharedHandleRef object is released, the local object is detached and destroyed. Subsequent access may be made to the shared handle reference object in the same manner as the first.

EXAMPLE

The following code fragment illustrates the usage of a shared handle reference mechanism. The numbers refer back to items in the Usage section.

SUMMARY

TDMkHandles are small, safe, and high-performance objects which can be used in place of pointers and references. They are ideal for situations where pointer or references are commonly used such as formal parameters and class attributes.

Because of the separation of handle and reference, robust class libraries can built which operate on underlying objects with widely-different creation management and destruction semantics.

The shared handle reference mechanism represents an important contribution to the ease of use of the distributed object manager mechanism. It provides transparent access of a server objects from client applications.

Coupled with the safety found in the handle mechanism, it adds significantly to ones ability to easily create robust distributed applications.

Name

Synopsis

Description

The shared handle reference mechanism is an extension of the handle mechanism described above. It provides the capability to reference objects in a server through the use of handles. When de-referenced, a local slave object is utilized. The management of the local object is performed by this mechanism.

TDMkSharedHandleReference objects are normally only made by the distributed object layer a distributed object manager.

EXAMPLE

Public Constructors

This constructor initializes a shared handle reference to an object in a server "session" whose instance id is "masterId".

Public Member Functions

This function formats the contents of the shared handle reference into a form suitable for viewing by people. It returns a pointer to a static area in memory. virtual void destroy;

This function is called when the last handle to this object is destroyed. It detaches the object from the server and destroys it.

This function is called in order to resolve a reference to a non-const object. It creates a local copy and joins it to the corresponding object in the server. It returns the object descriptor of the local object. virtual TDMkObjDesc resolvek( ) const;

This function is called in order to resolve a reference to a const object. It creates a local copy and joins it to the corresponding object in the server. It returns the object descriptor of the local object.

Attached hereto as Appendix A is the source code listing, in the C++ language, for the elements used and described above to implement the present invention.

APPENDIX A

HANDLE.C

```
template<class T>
TDMBool TDMkHandle<T>::ourDelete(void *object, void *objectK, TDMkObjDesc&
desc) {
    T* obj;
    if (object) obj = (T*)object;
    else if (objectK) obj = (T*)objectK;
    else {          // the object has not been resolved, if its' compatible,
                    // destroy it
        if (! desc.infoP()) return TRUE; // no object at all
        obj = tdmObjDesc_ptr_cast(T, desc);
        if (! obj) return FALSE; // incompatable type
    }
    delete obj;
    return TRUE;
}
```

HREF.H

```
//    $Id: href.h,v 1.8 1996/06/20 16:30:32 tjd Exp $
/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ ifndef __TDM_KANSAS_HANDLE_REFERENCE_H__
define __TDM_KANSAS_HANDLE_REFERENCE_H__
#define tdmkInvalidReference (*TDMkHandleRef::ourInitialize())

/*** href.h - Base class for handle references.
 *
 *          t. j. davidson                 May, 1995.
 *
 *          This class is a base class for constructing handle references.
 *          It provides a default implementation which maintains reference
 *          counts and resolves references when needed.
 */ include <kansas.h>
include KANSAS_RTTI_H
class ostream;
class TDMkHandleBase;
class TDMkHandleRef;
typedef void (*TDMkReferenceTracker)(const TDMkObjDesc& desc, const
TDMkHandleRef*);

class TDMkHandleRef {
public:
    TDMkHandleRef();
    TDMkHandleRef(const TDMkObjDesc& other);
    virtual ~TDMkHandleRef();

virtual TDMkHandleRef* destroy(TDMkHandleBase*);

virtual TDMkObjDesc resolve(TDMBool& cache);
    virtual TDMkObjDesc resolveK(TDMBool& cache) const;

virtual void acquire();
    virtual TDMkHandleRef* release(TDMkHandleBase*);

virtual TDMBool isValid() const;
    virtual TDMkObjDesc getObjDesc() const { return myDesc; };

virtual const char *asText() const;
```

```
        static TDMkHandleRef *ourDummy;
        static TDMkHandleRef* ourInitialize();
        static TDMkReferenceTracker ourRefTracker;

protected:
        nonshared INT32 myRefCount;
        nonshared TDMkObjDesc myDesc;
        void causeObjectDestruction(TDMkHandleBase*);

private:
        friend ostream& operator<<(ostream&, const TDMkHandleRef&);
        friend ostream& operator<<(ostream&, TDMkHandleRef&);
        friend class TDMkHandleBase;

// the copy constructor is made private so it will not be used.
        // This is needed because we do not want a const TDMkHandleRef to be
        // turned into a non-const TDMkHandleRef, and the language can not
        // help in detecting this.
        TDMkHandleRef(const TDMkHandleRef&);

// the assignment operator is made private so it will not be used.
        // This is needed because we do not want a const TDMkHandleRef to be
        // turned into a non-const TDMkHandleRef, and the language can not
        // help in detecting this.
        void operator=(const TDMkHandleRef&);
};
#endif // __TDM_KANSAS_HANDLE_REFERENCE_H__
```

A3

SHARREF.H

```
//    $Id: sharref.h,v 1.3 1996/06/20 16:31:12 tjd Exp $

/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ ifndef __TDM_KANSAS_SHARED_HANDLE_REFERENCE_H__
define __TDM_KANSAS_SHARED_HANDLE_REFERENCE_H__
#include <kansas.h>
#include KANSAS_OZ_H
#include KANSAS_HREF_H
class TDMkSession;

/*** sharref.h - Class for handle references to remote distributed objects.
 *
 *         t. j. davidson              May, 1995.
 *
 *         This class provides handle references for objects which are
 *         distributed via the Kansas mechanism.
 *         It specializes the TDMkHandleRef class by providing resolve and
 *         destroy functions.
 */ class TDMkSharedHandleRef : public TDMkHandleRef {
public:
     TDMkSharedHandleRef(TDMkSession& session, TDMkInstanceId masterId);
     virtual ~TDMkSharedHandleRef();

virtual TDMkHandleRef* destroy(TDMkHandleBase*);

virtual TDMkObjDesc resolve(TDMBool& cache);
     virtual TDMkObjDesc resolveK(TDMBool& cache) const;

virtual const char *asText() const;

private:
     // the copy constructor is made private so it will not be used.
     // This is needed because we do not want a const TDMkSharedHandleRef to be
     // turned into a non-const TDMkSharedHandleRef, and the language can not
     // help in detecting this.
     TDMkSharedHandleRef(const TDMkSharedHandleRef&);

// the assignment operator is made private so it will not be used.
     // This is needed because we do not want a const TDMkSharedHandleRef to be
```

```
      // turned into a non-const TDMkSharedHandleRef, and the language can
not
      // help in detecting this.
      void operator=(const TDMkSharedHandleRef&);

TDMkSession& mySession;
      TDMkInstanceId myMasterId;
      TDMkInstanceId myLocalId;
};

#endif // __TDM_KANSAS_SHARED_HANDLE_REFERENCE_H__
```

HANDLEB.H

```
//    $Id: handleb.h,v 1.11 1996/06/20 16:30:30 tjd Exp $

/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ ifndef __TDM_KANSAS_HANDLE_BASE_H__
define __TDM_KANSAS_HANDLE_BASE_H__

/*** TDMkHandleBase - A generic handle mechanism.
 *
 *         t. j. davidson                 May, 1995.
 *
 *         The TDMkHandleBase class provides common implementation code
 *         for the TDMkHandle template. This minimizes code bloat.
 */ if !defined(TDM_PARSE_TYPES)
include <iostream.h>
#endif
#include <kansas.h>
include KANSAS_HREF_H
class TDMkistream;
class TDMkostream;
class TDMkVariableDecl;
#define TDMkHandle_Any TDMkHandleBase
class TDMkHandleBase;
typedef TDMBool (*TDMkObjectDeletor)(void*, void*, TDMkObjDesc&);

class TDMkHandleBase {
public:
    TDMkHandleBase();
    TDMkHandleBase(TDMkHandleRef&);
    TDMkHandleBase(TDMkObjDesc);
    TDMkHandleBase(const TDMkHandleBase&);
    ~TDMkHandleBase()
        { delete myRef->release(this); };

TDMkHandleBase& operator=(TDMkHandleBase& other)
        { return assign(other); };

const TDMkHandleBase& operator=(const TDMkHandleBase& other) const
        {
            TDMkHandleBase *me = (TDMkHandleBase*)this;
            TDMkHandleBase& o  = (TDMkHandleBase&)other;
            me->assign(o);
            return *me;
        }
```

```
    TDMkHandleBase& operator=(const TDMkHandleBase& other)
        {
            // this conversion from const to non-const really
            // should not be permitted, but without it, you can't
            // use a const handle as a parameter in many RW calls
            // like insert(const T&) !!!

TDMkHandleBase& o = (TDMkHandleBase&)other;
            assign(o);
            return *this;
        }
if defined(_TDM_NEED_CONST_HELP)
    const TDMkHandleBase& operator=(TDMkHandleBase& other) const
        {
            TDMkHandleBase *me = (TDMkHandleBase*)this;
            me->assign(other);
            return *me;
        }
endif TDMkHandleBase& operator=(TDMkHandleRef& other)
        { return assignRef(other); } const TDMkHandleBase& operator=(const TDMkHandleRef& other) const
        {
            TDMkHandleBase *me = (TDMkHandleBase*)this;
            TDMkHandleRef& o = (TDMkHandleRef&)other;
            me->assignRef(o);
            return *this;
        }

TDMkHandleBase& operator=(const TDMkHandleRef& other)
        {
            // this conversion from const to non-const really
            // should not be permitted, but without it, you can't
            // use a const handle as a parameter in many RW calls
            // like insert(const T&) !!!

TDMkHandleRef& o = (TDMkHandleRef&)other;
            assignRef(o);
            return *this;
        }
if defined(_TDM_NEED_CONST_HELP)
    const TDMkHandleBase& operator=(TDMkHandleRef& other) const
        {
            TDMkHandleBase *me = (TDMkHandleBase*)this;
            me->assignRef(other);
            return *me;
        }
endif int operator==(const TDMkHandleBase& other) const
        { return other.myRef == myRef; };

int operator!=(const TDMkHandleBase& other) const
```

```
                { return other.myRef != myRef; };

TDMkHandleRef& getHandleRef() const { return *myRef; };

const char *asText() const;
        const char *asText();

TDMBool deleteObject();

TDMBool isValid() const
                { return (myObjectK || myObject)? TRUE : myRef->isValid(); };

void *resolveB(const TDMkObjDesc&);
        void *resolveB(const TDMkObjDesc&) const;

protected:
        TDMkHandleBase& assign(TDMkHandleBase& other)
                {
                        if (myRef != other.myRef) { // if a different object
                                delete myRef->release(this);
                                myObject = 0;
                                myObjectK = 0;
                                myRef = other.myRef;
                                // leave the delete function as-is (tjd)
                                // myDelete = other.myDelete;
                                myRef->acquire();
                        }
                        return *this;
                };

TDMkHandleBase& assignRef(TDMkHandleRef& otherRef)
                {
                        if (myRef != &otherRef) { // if a different object
                                delete myRef->release(this);
                                myObject = 0;
                                myObjectK = 0;
                                myRef = &otherRef;
                                // leave the delete function as-is (tjd)
                                // myDelete = 0; // don't know a specific delete
function
                                myRef->acquire();
                        }
                        return *this;
                };

void* myObject;         // pointer to the real object
        void* myObjectK;        // const pointer to the real object
        TDMkHandleRef *myRef;   // pointer to the reference object used
        TDMkObjectDeletor myDelete;

private:
#if !defined(_TDM_CONST_COPYCTOR_UNIQUE)
        //TDMkHandleBase(const TDMkHandleBase&); // disable access
#endif
#if !defined(TDM_PARSE_TYPES)
        friend ostream& operator<<(ostream& os, TDMkHandleBase& me)
                { return os << "TDMkHandle: " << *me.myRef; };
```

```
        friend ostream& operator<<(ostream& os, const TDMkHandleBase& me)
            { return os << "const-TDMkHandle: " << *me.myRef; };
#endif
        friend TDMkistream& readHandleBase(TDMkistream& is,
            const TDMkVariableDecl&, void *obj);
        friend TDMkostream& writeHandleBase(TDMkostream& os,
            const TDMkVariableDecl&, void *obj);
};

TDMKDECLARE_BASICTYPE(TDMkHandleBase)

#if !defined(TDM_PARSE_TYPES)

inline TDMkHandleBase::TDMkHandleBase()
        :   myObject(0), myObjectK(0), myRef(TDMkHandleRef::ourInitialize()),
            myDelete(0)
{ myRef->acquire(); } inline TDMkHandleBase::TDMkHandleBase(const TDMkHandleBase& b)
        :   myObject(0), myObjectK(b.myObjectK), myRef(b.myRef),
            myDelete(b.myDelete)
{ myRef->acquire(); } inline TDMkHandleBase::TDMkHandleBase(TDMkHandleRef& other)
        :   myObject(0), myObjectK(0), myRef(&other),
            myDelete(0)
{ myRef->acquire(); } if 0
inline TDMkHandleBase::operator TDMkHandleRef&()
{ return *myRef; };

inline TDMkHandleBase::operator const TDMkHandleRef&() const
{ return *myRef; };
endif endif // !defined(TDM_PARSE_TYPES)

endif // __TDM_KANSAS_HANDLE_BASE_H__
```

A9

HANDLE.H

```
//    $Id: handle.h,v 1.11 1996/07/19 20:52:43 tjd Exp $

/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ ifndef __TDM_KANSAS_HANDLE_H__
define __TDM_KANSAS_HANDLE_H__

/*** TDMkHandle<T> - A generic handle mechanism.
 *
 *         t. j. davidson             May, 1995.
 *
 *         The TDMkHandle<T> template provides a high-performance, robust
 *         and generic mechanism for handling object references.
 */ include <kansas.h>
include KANSAS_RTTI_H
include KANSAS_HANDLEB_H template<class T> class TDMkHandle : public TDMkHandleBase {
public:
    TDMkHandle() : TDMkHandleBase()
        { myDelete = ourDelete; };
    //TDMkHandle(T *object) : TDMkHandleBase(tdmObjDesc(*object))
        //{ myDelete = ourDelete; };
    TDMkHandle(const TDMkHandleBase& o) : TDMkHandleBase(o)
        { myDelete = ourDelete; };
    TDMkHandle(TDMkHandleRef& o) : TDMkHandleBase(o)
        { myDelete = ourDelete; };

TDMBool isResolved() const
        { TDMBool c; return 0 != (void*)myRef->resolveK(c); };

TDMkHandle<T>& operator=(TDMkHandle<T>& other)
        { assign(other); return *this; } const TDMkHandle<T>& operator=(const TDMkHandle<T>& other) const
        {
            TDMkHandle<T>* me = (TDMkHandle<T>*)this;
            TDMkHandle<T>& o  = (TDMkHandle<T>&)other;
            me->assign(o);
            return *this;
        }

TDMkHandle<T>& operator=(const TDMkHandle<T>& other)
```

```
            {
                    // this conversion from const to non-const really
                    // should not be permitted, but without it, you can't
                    // use a const handle as a parameter in many RW calls
                    // like insert(const T&) !!!

TDMkHandle<T>& o = (TDMkHandle<T>&)other;
                    assign(o);
                    return *this;
            }
if defined(_TDM_NEED_CONST_HELP)
      const TDMkHandle<T>& operator=(TDMkHandle<T>& other) const
            {
                    TDMkHandle<T>* me = (TDMkHandle<T>*)this;
                    me->assign(other);
                    return *this;
            }
endif TDMkHandle<T>& operator=(TDMkHandleRef& o)
            {
                    assignRef(o);
                    return *this;
            } const TDMkHandle<T>& operator=(const TDMkHandleRef& other) const
            {
                    TDMkHandle<T>* me = (TDMkHandle<T>*)this;
                    TDMkHandleRef& o = (TDMkHandleRef&)other;
                    me->assignRef(o);
                    return *this;
            }

TDMkHandle<T>& operator=(const TDMkHandleRef& other)
            {
                    // this conversion from const to non-const really
                    // should not be permitted, but without it, you can't
                    // use a const handle as a parameter in many RW calls
                    // like insert(const T&) !!!

TDMkHandleRef& o = (TDMkHandleRef&)other;
                    assignRef(o);
                    return *this;
            } if defined(_TDM_NEED_CONST_HELP)
      const TDMkHandle<T>& operator=(TDMkHandleRef& other) const
            {
                    TDMkHandle<T>* me = (TDMkHandle<T>*)this;
                    me->assignRef(other);
                    return *this;
            }
endif TDMkHandle<T>& operator=(TDMkHandleBase& other)
            { assign(other); return *this; }
```

```
        const TDMkHandle<T>& operator=(const TDMkHandleBase& other) const
            {
                TDMkHandle<T>* me = (TDMkHandle<T>*)this;
                TDMkHandleBase& o = (TDMkHandleBase&)other;
                me->assign(o);
                return *this;
            }

TDMkHandle<T>& operator=(const TDMkHandleBase& other)
            {
                // this conversion from const to non-const really
                // should not be permitted, but without it, you can't
                // use a const handle as a parameter in many RW calls
                // like insert(const T&) !!!

TDMkHandleBase& o = (TDMkHandleBase&)other;
                assign(o);
                return *this;
            }
if defined(_TDM_NEED_CONST_HELP)
        const TDMkHandle<T>& operator=(TDMkHandleBase& other) const
            {
                TDMkHandle<T>* me = (TDMkHandle<T>*)this;
                me->assign(other);
                return *this;
            }
endif if !defined(TJD_CODE_HANDLES)
        T* operator->()
            //{ if (! myObject) return (T*)resolve(); else return
(T*)myObject; };
            //{ return myObject || (T*)resolve(); };
            // next is fastest (on SGI)!
            { return (!myObject)? (T*)resolve() : (T*)myObject; };
        const T* operator->() const
            { return (!myObjectK)? (const T*)resolveK() : (const T*)myObjectK;
};
endif T& operator*()
            { return (!myObject)? *(T*)resolve() : *(T*)myObject; };
        const T& operator*() const
            { return (!myObjectK)? *(const T*)resolveK() : *(const
T*)myObjectK; };

operator TDMBool() const
            { return isValid(); } protected:
        // the copy constructor is made private so it will not be used.
        // This is needed because we do not want a const handle to be
        // turned into a non-const handle, and the language can not
        // help in detecting this.
        //TDMkHandle(const TDMkHandle<T>&);
```

```
      T* resolve()
            { return (T*)resolveB(tdmObjDesc((const T* const)0)); }
      const T* resolveK() const
            { return (T*)resolveB(tdmObjDesc((const T* const)0)); } private:
if !defined(TDM_PARSE_TYPES)
      friend ostream& operator<<(ostream& os, TDMkHandle<T>& me)
            { return os << "TDMkHandle: " << *me.myRef; };
      friend ostream& operator<<(ostream& os, const TDMkHandle<T>& me)
            { return os << "const-TDMkHandle: " << *me.myRef; };
#endif
      static TDMBool ourDelete(void*, void*, TDMkObjDesc&);
};

#if  defined(TDM_COMPILE_INSTANTIATE)
#include KANSAS_HANDLE_C
endif endif // __TDM_KANSAS_HANDLE_H__
```

HEAPREF.H

```
//    $Id: heapref.h,v 1.4 1996/06/20 16:30:31 tjd Exp $

/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ ifndef __TDM_KANSAS_HEAP_HANDLE_REFERENCE_H__
define __TDM_KANSAS_HEAP_HANDLE_REFERENCE_H__

/*** heapref.h - Class for handle references to object on the heap.
 *
 *         t. j. davidson                May, 1995.
 *
 *         This class provides handle references for objects created on the
 *         system heap. It specializes the TDMkHandleRef class by providing a
 *         destroy function which deletes both the object and the handle
 *         reference.
 */ include <kansas.h>
include KANSAS_HREF_H class TDMkHeapHandleRef : public TDMkHandleRef {
public:
      TDMkHeapHandleRef() { };
      TDMkHeapHandleRef(const TDMkObjDesc& object) : TDMkHandleRef(object) {
};
      static TDMkHandleRef& make(const TDMkObjDesc& object);
      virtual ~TDMkHeapHandleRef();

virtual TDMkHandleRef* destroy(TDMkHandleBase*);

virtual const char *asText() const;

private:
      // the copy constructor is made private so it will not be used.
      // This is needed because we do not want a const TDMkHeapHandleRef to
be
      // turned into a non-const TDMkHeapHandleRef, and the language can not
      // help in detecting this.
      TDMkHeapHandleRef(const TDMkHeapHandleRef&);

// the assignment operator is made private so it will not be used.
      // This is needed because we do not want a const TDMkHeapHandleRef to
be
      // turned into a non-const TDMkHeapHandleRef, and the language can not
      // help in detecting this.
```

```
    void operator=(const TDMkHeapHandleRef&);
};

#endif // __TDM_KANSAS_HEAP_HANDLE_REFERENCE_H__
```

HEAPREF.CPP

```
static    const char     rcsid[] = "$Id: heapref.cpp,v 1.6 1996/07/01
21:56:44 tjd Exp $";

/*
 *      (c) Tandem Computers Incorporated 1995.
 *
 *      The computer program listings and specification herein are the
 *      property of Tandem Computers Incorporated and are not to be
 *      reproduced or copied in whole or in part for any reason without
 *      written permission of Tandem.
 */ include <iostream.h>
include <string.h>
#include <kansas.h>
#include KANSAS_RTTIP_H
#include KANSAS_EXCEPTS_H
#include KANSAS_MODULE_H
#include KANSAS_HANDLEB_H
include KANSAS_HEAPREF_H //      Statics, globals and externs.

static TDMkModule thisModule(__FILE__, 0);

/*** TDMkHeapHandleRef::make - Construct a heap handle reference.
 *
 *      This convenience function makes a new heap handle reference
 *      object in the system heap and returns its handle.
 *
 *      entry   (const TDMkObjDesc& object) = object descriptor.
 *
 *      exit (TDMkHandleRef&) = handle reference.
 *                  = tdmkInvalidReference, if handle reference not
made.
 */
TDMkHandleRef&
TDMkHeapHandleRef::make(const TDMkObjDesc& object)
{
    TDMkHandleRef *hr = new TDMkHeapHandleRef(object);
    if (hr) return *hr;

return tdmkInvalidReference;
}

/*** TDMkHeapHandleRef::~TDMkHeapHandleRef - Destructor.
```

```
 *
 *      This destructor doesn't do much. Its here to try and minimize
 *      code bloat because constructors are declared and some compilers
 *      get upset of a destructor is not declared.
 */
TDMkHeapHandleRef::~TDMkHeapHandleRef()
{ }

/*** TDMkHeapHandleRef::asText - Convert a handle reference to a string.
 *
 *      This function formats a TDMkHeapHandleRef object into a printable
 * string.
 *
 *      exit (const char*) = printable string.
 */
const char*
TDMkHeapHandleRef::asText() const
{
    return form("TDMkHeapHandleRef(0x%lx) object to: %s, %d handles
attached.",
           (void*)this, myDesc.asText(), myRefCount);
}

/*** TDMkHeapHandleRef::destroy - Destroy underlying object.
 *
 *      This function is called when a reference count for an
 *      object is decremented to zero. This implementation destroys
 *      both the actual object and this handle reference object.
 *
 *      exit (void*) = address of actual object to delete.
 */
TDMkHandleRef*
TDMkHeapHandleRef::destroy(TDMkHandleBase *base)
{
    if (thisModule.isDebug())
        thisModule.os() << "TDMkHeapHandleRef::destroy "
                        << (TDMkHandleRef&)*this << endl;

causeObjectDestruction(base);

return this; // ask caller to destroy us!
}
```

HREF.CPP

```
static    const char    rcsid[] = "$Id: href.cpp,v 1.11 1996/07/01 21:56:44
tjd Exp $";

/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ include <iostream.h>
include <string.h>
#include <kansas.h>
#include KANSAS_RTTIP_H
#include KANSAS_EXCEPTS_H
#include KANSAS_MODULE_H
#include KANSAS_HANDLEB_H
include KANSAS_HREF_H //      Statics, globals and externs.

static TDMkModule thisModule(__FILE__, 0);
TDMkHandleRef *TDMkHandleRef::ourDummy = 0;
TDMkReferenceTracker TDMkHandleRef::ourRefTracker = 0;

TDMkHandleRef*
TDMkHandleRef::ourInitialize()
{
    if (! ourDummy)
        ourDummy = new TDMkHandleRef(tdmkUnknownObjDesc);
    return ourDummy;
}

TDMkHandleRef::TDMkHandleRef()
    :    myRefCount(0)
{ }

TDMkHandleRef::TDMkHandleRef(const TDMkObjDesc& o)
    :    myRefCount(0), myDesc(o)
{
    if (ourRefTracker)
        ourRefTracker(myDesc, this);
}

/*** TDMkHandleRef::~TDMkHandleRef - Destructor.
 *
 *        This destructor doesn't do much. Its here to try and minimize
```

```
 *         code bloat becasue it is declared virtual.
 */

TDMkHandleRef::~TDMkHandleRef()
{
    if (ourRefTracker)
        ourRefTracker(myDesc, 0);
}

/*** TDMkHandleRef::acquire - Acquire a reference to an object.
 *
 *          This function is called whenever a handle object is created
 *          to an real object. It acquires a reference to the object, but
 *          does not resolve it.
 */ void TDMkHandleRef::acquire()
{
    ++myRefCount;
    if (thisModule.isDebug())
        thisModule.os() << "TDMkHandleRef::acquire now " << *this << endl;
}

/*** TDMkHandleRef::asText - Convert a handle reference to a string.
 *
 *          This function formats a TDMkHandleRef object into a printable
 string.
 *
 *          exit (const char*) = printable string.
 */ const char*
TDMkHandleRef::asText() const
{
    return form("TDMkHandleRef(0x%lx) object to: %s, %d handles attached.",
            (void*)this, myDesc.asText(), myRefCount);
}

/*** TDMkHandleRef::destroy - Destroy underlying object.
 *
 *          This function is called when a reference count for an
 *          object is decremented to zero. This implementation does
 *          nothing.
 *
 *          exit (TDMkHandleRef*) = this, if this handleref should be
 destroyed.
 */

TDMkHandleRef*
```

```
TDMkHandleRef::destroy(TDMkHandleBase*)
{
    if (thisModule.isDebug())
        thisModule.os() << "TDMkHandleRef::destroy " << *this << endl;

return 0; // don't destroy anything
}

/*** TDMkHeapHandleRef::causeObjectDestruction - Cause object destuction.
 *
 *      This member function deletes an object by calling some routine
which
 *      can destroy the object. This may be done by an internal routine
 *      if the class has rtti, or by a templated dtor.
 *
 *      entry    (TDMkHandleBase *base) = handle base object.
 */
void
TDMkHandleRef::causeObjectDestruction(TDMkHandleBase *base)
{
    const TDMkTypeInfo& type = myDesc;
    TDMkPfDeleteFunc od = 0;
    if (&type) od = type.deleteFunc();

if (od) { // the type information knows how to destroy
        od(myDesc);
    } else if (! base->deleteObject()) { // handle base didn't know how
        void *object = myDesc;
        if (&type && object) { // there was an object, and we can't
destroy it
            TDMKEXCEPTION(ExNotImplemented,ex);
            ex.resource_name = form("%s::~%s", type.name(), type.name());
            ex.default_msg =
                form("Error: Unable to invoke %s on 0x%lx",
                    ex.resource_name.data(), (void*)myDesc);
            TDMThrow(ex);
        }
    }
    if (ourRefTracker)
        ourRefTracker(myDesc, 0);
}

/*** TDMkHandleRef::isValid - Test if reference is valid.
 *
 *      This function is called when to test if a reference is valid.
 *
 *      exit (TDMBool) = TRUE, if reference is valid.
 */

TDMBool
TDMkHandleRef::isValid() const
```

```
{
    void *object = myDesc;
    return (0 != object);
}

/*** TDMkHandleRef::release - Release reference.
 *
 *      This function is called when an object reference is released,
 *      either because the handle object is being destroyed, or is
 *      being assigned to a different object reference.
 */

TDMkHandleRef*
TDMkHandleRef::release(TDMkHandleBase *base)
{
    if (this != ourDummy) {
        if (thisModule.isDebug())
            thisModule.os() << "TDMkHandleRef::release " << *this << endl;

if (0 == --myRefCount) {
            return destroy(base);
        }
    }
    return 0; // nothing to destroy
}

/*** TDMkHandleRef::resolve - Resolve object reference.
 *
 *      This function is called to resolve a reference to an object. This
 *      implementation simply returns the object descriptor.
 *
 *      exit (TDMBool& cachePermitted) = TRUE, indicating that caching of
 *                       the object's address is permitted by the handle.
 *             (TDMkObjDesc) = the object descriptor for the actual
 object.
 */

TDMkObjDesc
TDMkHandleRef::resolve(TDMBool& cachePermitted)
{
    if (thisModule.isDebug())
        thisModule.os() << "TDMkHandleRef::resolve " << *this << endl;

if (this == ourDummy) {
        TDMKEXCEPTION(ExAssertion, ex);
        ex.assertion = form("attempt to resolve dummy object (%s)", asText());
        ex.default_msg = form("Assertion: %s.", ex.assertion.data());
        TDMThrow(ex);
    } cachePermitted = TRUE;
```

```
        return myDesc;
}

/*** TDMkHandleRef::resolve - Resolve const object reference.
 *
 *       This function is called to resolve a reference to a const object.
This
 *       implementation simply returns the object descriptor.
 *
 *       exit (TDMBool& cachePermitted) = TRUE, indicating that caching of
 *                    the object's address is permitted by the handle.
 *              (TDMkObjDesc) = the object descriptor for the actual
object.
 */

TDMkObjDesc
TDMkHandleRef::resolveK(TDMBool& cachePermitted) const
{
        if (thisModule.isDebug())
              thisModule.os() << "TDMkHandleRef::resolve const " << *this <<
endl;

if (this == ourDummy) {
              TDMKEXCEPTION(ExAssertion, ex);
              ex.assertion = form("attempt to resolve dummy object (%s)",
asText());
              ex.default_msg = form("Assertion: %s.", ex.assertion.data());
              TDMThrow(ex);
        } cachePermitted = TRUE;

return myDesc;
}

/*** operator<< - Insert a TDMkHandleRef object into an ostream.
 *
 *       This operators formats and inserts a TDMkHandleRef object into
 *       the specified ostream.
 *
 *       entry    (ostream& os) = ostream to operate upon.
 *                (TDMkHandleRef& me) = the handle reference to insert.
 *
 *       exit (ostream&) = os, upon entry.
 */ ostream&
operator<<(ostream& os, TDMkHandleRef& me)
{
        return os << me.asText();
}
```

```
/*** operator<< - Insert a const TDMkHandleRef object into an ostream.
 *
 *       This operators formats and inserts a const TDMkHandleRef object
 *       into the specified ostream.
 *
 *       entry    (ostream& os) = ostream to operate upon.
 *                (const TDMkHandleRef& me) = the handle reference to
insert.
 *
 *       exit (ostream&) = os, upon entry.
 */ ostream&
operator<<(ostream& os, const TDMkHandleRef& me)
{
    return os << "const " << me.asText();
}
```

HANDLES.CPP

```
    static    const char    rcsid[] = "$Id: handleb.cpp,v 1.5 1996/07/01
21:56:43 tjd Exp $";
/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ include <iostream.h>
include <kansas.h>
#include KANSAS_RTTIP_H
#include KANSAS_EXCEPTS_H
#include KANSAS_HANDLEB_H
include KANSAS_LOCALCLS_H /*** TDMkHandleBase::resolveB - Resolve a handle.
 *
 *        This function is called when a handle is de-referenced for
 *        the first time for a non-const object. It casts the object
 *        to the desired type and returns the address of the object.
 *
 *        entry    (const TDMkObjDesc& neededDesc) = the type of the needed
object.
 *
 *        exit (void*) = the address of the object.
 */
void*
TDMkHandleBase::resolveB(const TDMkObjDesc& neededDesc)
{
    TDMBool cachePermitted;
    void *object = neededDesc.castPtr(myRef->resolve(cachePermitted),
__FILE__, __LINE__);
    if (! object) {
        TDMKEXCEPTION(ExObjNotFound,ex);
        ex.resource_name = neededDesc.asText();
        ex.default_msg = form("Attempt to resolve an incomplete object
(%s)",
                ex.resource_name.data());
        TDMThrow(ex);
    }
    if (cachePermitted) myObject = object;

return object;
}
```

```
/*** TDMkHandleBase::resolveB - Resolve a handle.
 *
 *        This function is called when a handle is de-referenced for
 *        the first time for a const object. It casts the object
 *        to the desired type and returns the address of the object.
 *
 *        entry    (const TDMkObjDesc& neededDesc) = the type of the needed
object.
 *
 *        exit (void*) = the address of the object.
 */
void*
TDMkHandleBase::resolveB(const TDMkObjDesc& neededDesc) const
{
    TDMkHandleBase *me = (TDMkHandleBase*)this;
    TDMBool cachePermitted;
    void *object = neededDesc.castPtr(myRef->resolveK(cachePermitted),
__FILE__, __LINE__);
    if (!object) {
        TDMKEXCEPTION(ExObjNotFound,ex);
        ex.resource_name = neededDesc.asText();
        ex.default_msg = form("Attempt to resolve an incomplete object
(%s)",
            ex.resource_name.data());
        TDMThrow(ex);
    }
    if (cachePermitted) me->myObjectK = object;

return object;
} const char*
TDMkHandleBase::asText()
{
    return form("TDMkHandleBase: %s", myRef->asText());
}

TDMBool
TDMkHandleBase::deleteObject()
{
    // if this handle has a deletor function, ask it to try to delete if (myDelete) return myDelete(myObject, myObjectK, myRef->myDesc);

return FALSE; // object was not destroyed
} if 1
TDMKDEFINE_BASIC_CLASS(TDMkHandleBase,__TDMKHANDLEBASE);
#else
static void *queryHandleBase(void*, int, int);
```

```
static void deleteHandleBase(void *o)
{ TDMkHandleBase *b = (TDMkHandleBase*)o; delete b; }
static TDMkLocalClass infoHandleBase("TDMkHandleBase", __TDMKHANDLEBASE,
    sizeof(TDMkHandleBase), queryHandleBase, deleteHandleBase);

static void*
queryHandleBase(void *obj, int key, int base)
{
    TDMkHandleBase *me = (TDMkHandleBase*)obj;
    return key,base,(void*)0;
}

TDMkObjDesc
tdmObjDesc(const TDMkHandleBase& object)
{
    if ((void*)&object == (void*)&TDMkNull)
       return TDMkObjDesc(infoHandleBase, 0);
     else
       return TDMkObjDesc(infoHandleBase, (void*)&object);
}

TDMkObjDesc
tdmObjDesc(const TDMkHandleBase* const & obj)
{
    return TDMkObjDesc(infoHandleBase.peer(), &obj);
}
endif
```

SHARREF.CPP

```
static    const char    rcsid[] = "$Id: sharref.cpp,v 1.6 1996/07/01 21:56:10 tjd Exp $";

/*
 *    (c) Tandem Computers Incorporated 1995.
 *
 *    The computer program listings and specification herein are the
 *    property of Tandem Computers Incorporated and are not to be
 *    reproduced or copied in whole or in part for any reason without
 *    written permission of Tandem.
 */ include <stdio.h>
include <iostream.h>
include <kansas.h>
#include KANSAS_OZP_H
#include KANSAS_CDCLDICT_H
#include KANSAS_EXCEPTS_H
#include KANSAS_INSTDICT_H
#include KANSAS_INSTINFO_H
#include KANSAS_MODULE_H
#include KANSAS_SESSION_H
include KANSAS_SHARREF_H /*** sharref.cpp - Shared Handle Reference.
 *
 *        t. j. davidson          June, 1995.
 *
 *        This module contains the implementation for the shared handle
 *        reference class, TDMkSharedHandleRef. Objects of this type are
 *        used to automatically manage slave object access to master
objects.
 */

//        Externs, globals and statics.

extern TDMkFeature TDMkOzFeature;
static TDMkModule thisModule(__FILE__, &TDMkOzFeature);

/*** TDMkSharedHandleRef - Constructor.
 *
 *        entry    (TDMkSession& session) = the session housing the real
object.
 *                 (TDMkInstanceId masterId) = the real object's master id.
 */

TDMkSharedHandleRef::TDMkSharedHandleRef(TDMkSession& session,
      TDMkInstanceId masterId)
```

```
        :       mySession(session), myMasterId(masterId)
{
        TDMkInstanceDictionary& d = session.hisDict();
        myDesc = d[masterId]->tdmObjDesc();
        TDMkHandleRef *me = this;
        if (thisModule.isDebug())
                thisModule.os() << "constructor " << *me << endl;
}

/*** TDMkSharedHandleRef - Destructor.
 *
 */

TDMkSharedHandleRef::~TDMkSharedHandleRef()
{
        TDMkHandleRef *me = this;
        if (thisModule.isDebug())
                thisModule.os() << "destructor " << *me << endl;
}

/*** TDMkSharedHandleRef::asText - Format the handle reference into text.
 *
 *      This function formats the handle reference object into a readable
 *      text version.
 *
 *      exit (RWCString) = textual version.
 */ const char*
TDMkSharedHandleRef::asText() const
{
        static char result[500];
        sprintf(result,
            "TDMkSharedHandleRef: %s, session: 0x%lx, masterId: %ld",
            TDMkHandleRef::asText(), &mySession, myMasterId);
        return result;
}

/*** TDMkSharedHandleRef::destroy - Process final usage of this local
object.
 *
 *      This routine is called whe the last handle to this object is
destroyed.
 *      It detaches the object and destroys it.
 *
 *      exit (void*) = address of actual object to destroy.
 */
```

```
TDMkHandleRef*
TDMkSharedHandleRef::destroy(TDMkHandleBase *base)
{
      TDMkHandleRef *me = this;
      if (thisModule.isDebug())
            thisModule.os() << "::destroy " << *me << endl;

causeObjectDestruction(base);

// clean up this handle reference so it may live again another day myDesc = tdmkUnknownObjDesc;
      myMasterId = 0;

return 0; // nothing to destroy!
}

/*** TDMkSharedHandleRef::resolve - Create and join to a master object.
 *
 *       This function is called in order to resolve a reference to a const
 *       object. It creates a local copy and joins it to the corresponding
 *       object in the server.
 *
 *       exit (TDMBool& cachePermitted) = TRUE, to indicate that the
 *                      object's address may be saved.
 *              (TDMkObjDesc) = object descriptor of local object.
 */

TDMkObjDesc
TDMkSharedHandleRef::resolve(TDMBool& cachePermitted)
{
      TDMkHandleRef *me = this;
      cachePermitted = TRUE;

void *object = myDesc;
      if (object) return myDesc; // if already resolved if (thisModule.isDebug())
            thisModule.os() << "::resolve " << *me << endl;

// First, locate the instance information for the master object.
      // This describes its type.

TDMkInstanceDictionary& dict = mySession.hisDict();
      TDMkInstanceInfo *info = dict[myMasterId];
      if (! info) {
            TDMKEXCEPTION(INV_OBJREF, ex);
            TDMThrow(ex);
      }

// Now, create a local object of this type.

// make sure its a shareable
```

```
        TDMkObjDesc desc = info->tdmObjDesc();
        TDMkShareableObject *sharObj = 0;
        if (! (desc >= tdmObjDesc(*sharObj))) {
            TDMKEXCEPTION(INV_OBJREF, ex);
            TDMThrow(ex);
        }

// we need to convert to a TDMkClassDecl, since the constructObject
        // call only exists there. We will just look it up (sigh)

const TDMkClassDecl& decl = ::tdmkAllLocalClassDecl[desc];

// now, make an object on this side object = decl.constructObject(0);
        if (! object) {
            TDMKEXCEPTION(NO_MEMORY, ex);
            TDMThrow(ex);
        }

// update myDesc to describe the local object myDesc = TDMkObjDesc(decl, object);
        if (ourRefTracker)
            ourRefTracker(myDesc, this);

sharObj = tdmObjDesc_ptr_cast(TDMkShareableObject, myDesc);

// join this local object to the remote object sharObj->ozJoinToMaster(mySession, myMasterId);

// we are done. The local object has been created and joined.

return myDesc;
}

/*** TDMkSharedHandleRef::resolveK - Resolve a reference to a const object.
 *
 *      This function is called in order to resolve a reference to a const
 *      object. It creates a local copy and joins it to the corresponding
 *      object in the server.
 *
 *      exit (TDMBool& cachePermitted) = TRUE, to indicate that the
 *                      object's address may be saved.
 *              (TDMkObjDesc) = object descriptor of local object.
 */

TDMkObjDesc
TDMkSharedHandleRef::resolveK(TDMBool& cachePermitted) const
{
        const TDMkHandleRef *me = this;

if (thisModule.isDebug())
            thisModule.os() << "::resolveK " << *me << endl;
```

```
        // The implementation for non-const objects is appropriate
        // for const ones too, so we will just use it!

TDMkSharedHandleRef* meme = (TDMkSharedHandleRef*)this;
        return meme->resolve(cachePermitted);
}
```

What is claimed is:

1. A method of managing two or more references to an object in an object-oriented programming language that includes the steps of:
   declaring a reference class that includes a count attribute, and a delete attribute;
   creating an object reference from the reference class that includes a pointer to the object and a reference count;
   for each reference to the object, creating an object handle to the object by referencing the object reference instead of the object and incrementing the reference count by such reference to the object reference;
   employing the delete attribute to destroy each object handle and, for each object handle destroyed, decrementing the reference count; and
   destroying the object if the reference count is a predetermined value.

2. The method of claim 1, wherein the delete attribute includes a call to a virtual function that is made when the object handle is destroyed and the reference count is decremented to the predetermined value.

3. The method of claim 1, wherein the predetermined value is equal to zero.

4. A method of managing two or more references to an object in an object-oriented programming language that includes the steps of:
   declaring a reference class that includes a count attribute and a delete function;
   creating an object reference from the reference class that includes a pointer to the object, a reference count of a predetermined value, and a call to a delete function;
   creating an object handle to the object for each reference to the object by referencing the object reference instead of the object and incrementing the reference count by such reference to the object reference;
   deleting the object handle by the call to the delete function and decrementing the reference count; and
   deleting the object if the reference count is equal to a predetermined value.

5. The method of claim 4, wherein the step of creating the object handle includes incrementing the reference count by one.

6. The method of claim 5, wherein the predetermined value is equal to zero.

7. The method of claim 6, wherein the step of deleting the object handle includes decrementing the reference count by one.

* * * * *

UNITED STATES PATENT AND TRADEMARK OFFICE
CERTIFICATE OF CORRECTION

PATENT NO.    : 6,230,213 B1
DATED         : May 8, 2001
INVENTOR(S)   : Thomas J. Davidson It is certified that error appears in the above-identified patent and that said Letters Patent is hereby corrected as shown below:

<u>Column 74,</u>
Lines 21-22, reads
" 6. The method of claim 5, wherein the predetermined value is equal to zero"; it should read
-- 6. The method of claim 5, wherein the step of deleting the object handle includes decrementing the reference count by one. --;
Lines 23-25, reads
"7. The method of claim 6, wherein the step of deleting the object handle includes decrementing the reference count by one."; it should read
-- 7. The method of claim 6, wherein the predetermined value is equal to zero --

Signed and Sealed this

Sixteenth Day of July, 2002

Attest:

Attesting Officer

JAMES E. ROGAN
*Director of the United States Patent and Trademark Office*